UNITED STATES PATENT OFFICE.

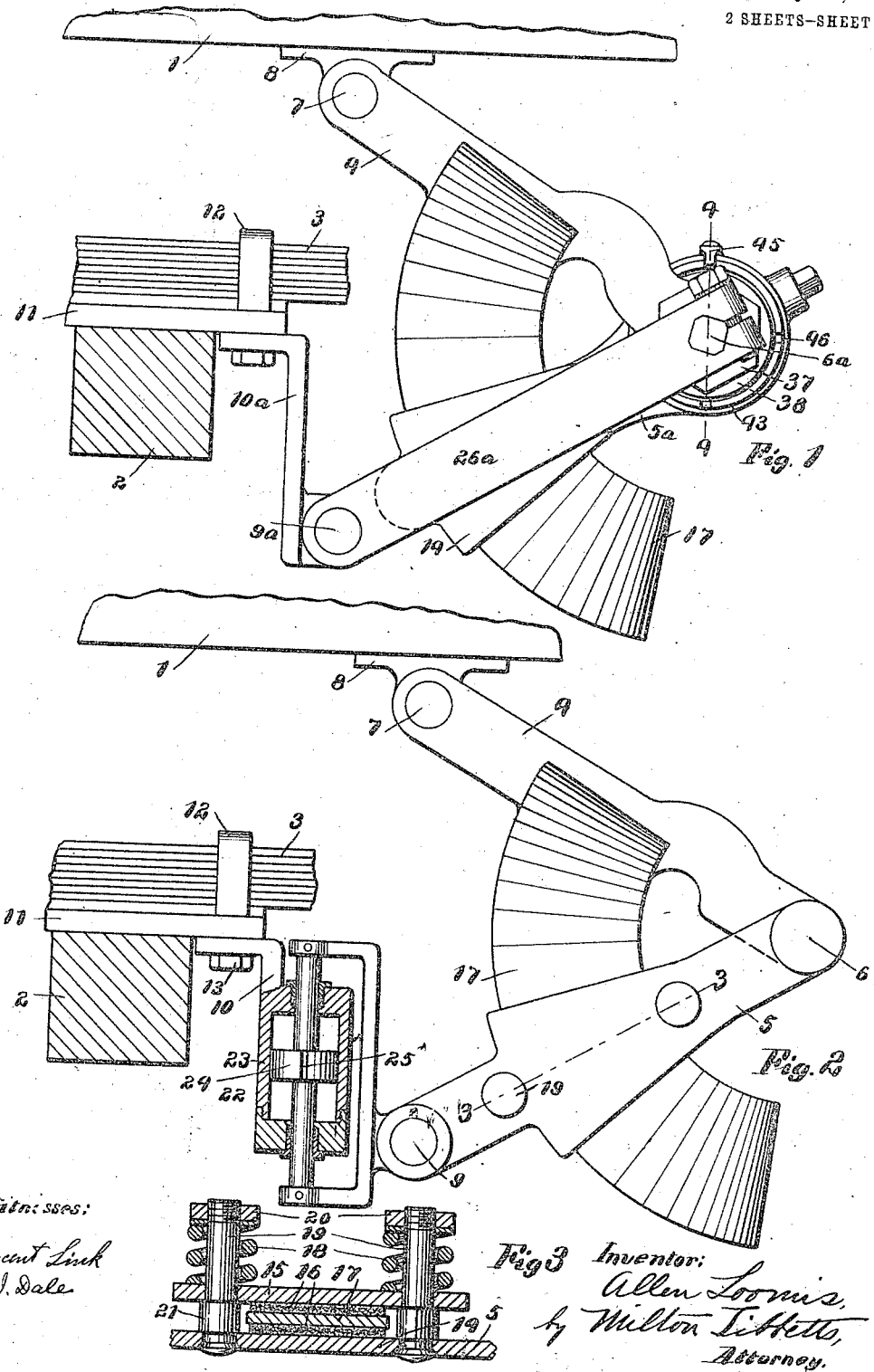

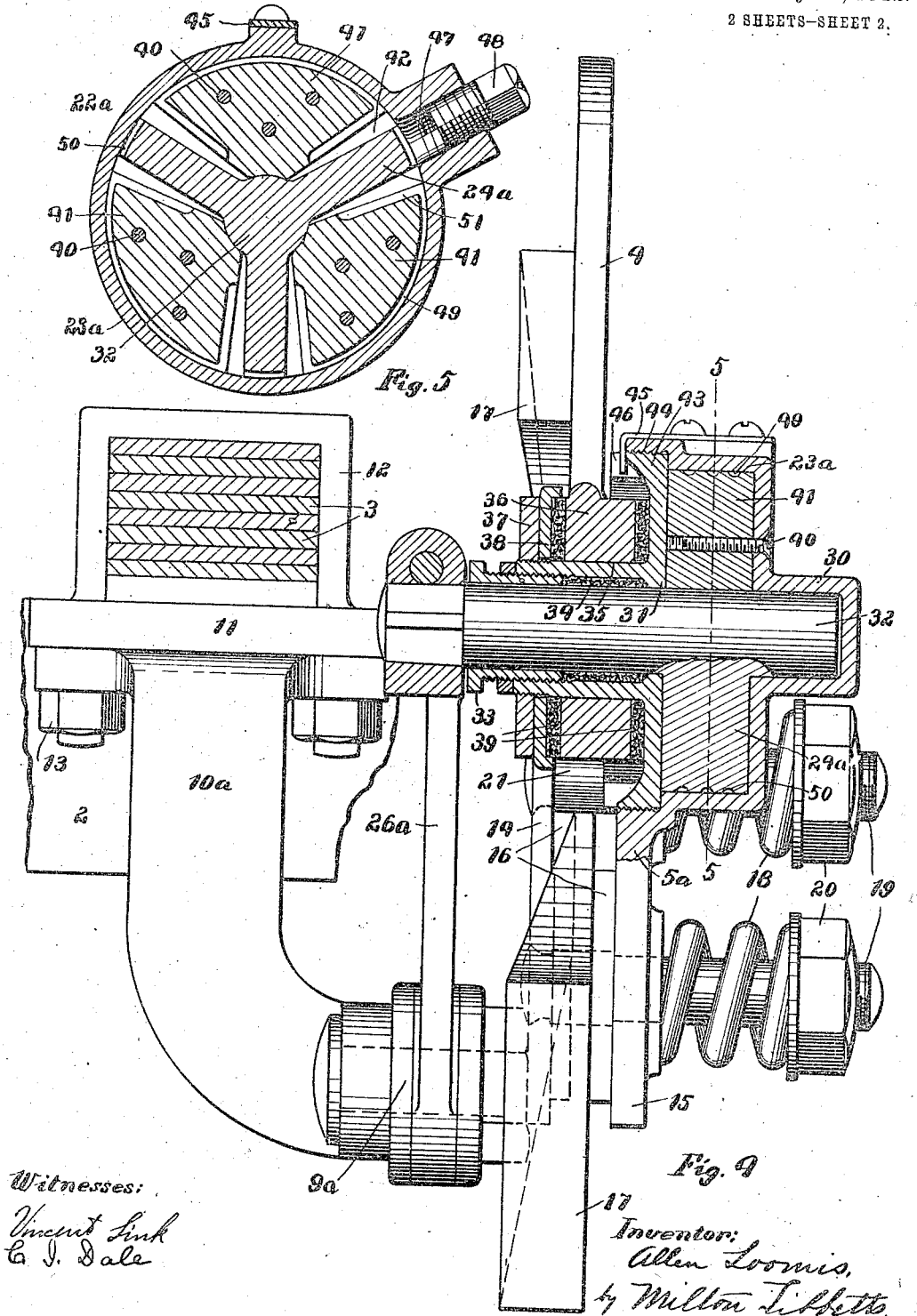

ALLEN LOOMIS, OF DETROIT, MICHIGAN, ASSIGNOR, BY MESNE ASSIGNMENTS, TO THE PACKARD MOTOR CAR COMPANY, OF DETROIT, MICHIGAN, A CORPORATION OF MICHIGAN.

SHOCK-ABSORBER.

1,027,866.  Specification of Letters Patent.  Patented May 28, 1912.

Application filed December 4, 1908. Serial No. 465,924.

*To all whom it may concern:*

Be it known that I, ALLEN LOOMIS, a citizen of the United States, and resident of Detroit, Wayne county, State of Michigan, have invented certain new and useful Improvements in Shock-Absorbers, of which the following is a specification.

This invention relates to improvements in devices for relieving the shock due to the relative vibration between the body or frame of a vehicle and its axle when the vehicle is moving over rough or uneven surfaces, and it is particularly adapted for use on motor vehicles.

More particularly this invention relates to shock absorbers or spring dampeners producing little or no resistance in the middle portion of their range of action and an increasing resistance toward both ends of the range; and it further relates to means for automatically shifting the middle point of least resistance of the shock absorber to correspond with different positions of the vehicle parts due to change of load.

The objects and advantages of the invention will appear in the detail description following.

In the accompanying drawings, Figure 1 is a side elevation of so much of a motor vehicle as is necessary to illustrate the invention, and one form of the invention is shown attached to such parts; Fig. 2 is a view similar to Fig. 1 and showing the invention applied in another form; Fig. 3 is a section on the line 3—3 of Fig. 2; Fig. 4 is an enlarged section on the line 4—4 of Fig. 1; and Fig. 5 is a section on the line 5—5 of Fig. 4.

As suggested hereinabove, this invention is particularly applicable to motor vehicles, in which considerable spring action is desirable, thus necessitating the use of springs loaded to nearly their maximum capacity, and for this class of vehicles many types of shock absorbers or spring dampeners have been devised to save the springs from too sudden or violent displacement at either end of their range of action, thus preventing spring breakages and greatly increasing the comfort of the passengers of the vehicle. Among these many devices is a general type having a point approximately at the middle of its range of action in which the resistance to the spring action is at a minimum and the vehicle this point is of course arranged to correspond with the mean position of the vehicle parts with a normal load on the body of said vehicle. Thus with such normal load the resistance of the shock absorber to the vehicle spring action is the same in either direction of such action, but if the vehicle is overloaded or is lighter than normal, the relation of the point of least resistance of the shock absorber to the mean position of the vehicle parts is altered and the shock absorber then resists the action of the vehicle spring more in one direction than in the other. This is sometimes mitigated in this class of absorber by the provision of means for rendering considerable of the middle portion of the range of operation of the shock absorber inactive so that there is no resistance to the action of the vehicle spring until said spring has nearly reached its limit in either direction. Of course it is advisable to allow a slight unrestricted movement of the vehicle spring at both sides of its mean center of action, but it will readily be seen to be an important object to have this mean position always corresponding with the middle point of least resistance of the shock absorber, whereby an equal resistance to the vehicle spring is obtained in both directions of movement. By the present invention this object is automatically attained, the middle point of least resistance of the shock absorber always remaining constant with the mean position of the vehicle parts.

The structures herein shown for automatically maintaining the point of least resistance of the shock absorber in correspondence with the mean position of the vehicle parts constitute the preferred embodiments of the invention, but it will be understood that many other constructions may be used without departing from the spirit of the invention.

Referring to the drawings, 1 designates a fragment of one of the side members of a vehicle frame, 2 is one of the axles of the vehicle, and 3 is a fragment of one of the springs which yieldably supports the frame from the axle, thus permitting relative vibratory movement between the axle and the frame.

Referring particularly to the form of the invention illustrated in Figs. 2 and 3, a is represented by the members 4 and 5 hinged together at 6, with the free end of the member 4 pivotally hung at 7 from a bracket 8 on the frame 1 of the motor vehicle, and with the arm 5 pivotally hung at 9 from a bracket 10 connected to the spring pad 11 of the axle 2 by the shackle 12 and nuts 13. Thus the relative vibratory movements of the frame 1 and axle 2 cause the members 4 and 5 to oscillate on the hinge 6, and this oscillation is resisted by the plates 14 and 15 lined with friction material 16 in contact with the wedge piece 17, which is thinnest at its middle portion and gradually increases in thickness toward its ends. The plates 14 and 15 are yieldably pressed together by springs 18 surrounding the posts 19, which are supported by one of the plates, the tensions of these springs being adjustable by nuts 20. The posts 19 are preferably enlarged as at 21 between the plates so that the action of the springs 18 will be nullified for a short distance near the middle of the path of travel of the friction plates along the sides of the wedge piece 17. Thus there is no resistance to the action of the spring 3 for a slight distance at each side of its mean center of vibration. One of the plates 14, 15, may be formed integral with the member 5 as shown in Figs. 2 and 3, or it may be separately constructed and suitably secured thereto.

If the free end of the member 5 were directly pivoted to the bracket 10 as in most shock absorbers of this type, any overloading or lightening of the vehicle would cause a shifting of the mean position of the axle 2 relative to the frame 1, and this mean position would not then correspond with the middle point of least resistance of the shock absorber and the consequent resistance of the absorber in one direction would be greater than in the other. But by pivoting the member 5 to the bracket 10 through a dash pot 22 or an equivalent sluggish retarding device, if the vehicle is overloaded, the resistance of the shock absorber to the first few relative vibrations of the axle will be greater in one direction than in the other which will cause the cylinder 23 of the dash pot 22 to rise slowly relative to the piston 24 whereby the altered mean position of the axle will soon again correspond with the middle point of least resistance of the shock absorber, and this automatic adjustment will again take place whenever the load on the vehicle body is changed. It will of course be understood that the space in the cylinder 23 of the dash pot is filled with a very heavy oil or grease, preferably an extremely thick graphite grease, and the piston 24 has a small passage 25 formed therein, whereby the action of the dash pot will be very sluggish. After the dash pot has adjusted itself to the vehicle load it will become practically inactive and will impair none of the functions of the shock absorber, the dash pot then becoming practically the same as a direct connection for the member 5 to the bracket 10. This automatic adjusting device takes the place of a turn buckle or similar manually operated adjusting means and it may be applied in various forms and to a large variety of shock absorbers, and another very compact construction of this improvement is illustrated in Figs. 1, 4 and 5, which construction will now be described.

The shock absorber proper illustrated in Figs. 1, 4 and 5, is similar to that shown in Figs. 2 and 3, comprising the members 4 and 5$^a$ hinged together at 6$^a$, the free end of the member 4 being pivoted at 7 to the bracket 8 on the frame 1. On the member 4 is a wedge piece 17 arranged concentric with the pivot 6$^a$ and tapering from both ends toward its middle portion as in Fig. 2. Frictionally engaging the sides of the wedge piece 17 are the friction lining pieces 16 on the plates 14 and 15, which plates are yieldably pressed together by the spring 18 on the posts 19 and adjusted by the nuts 20. Enlargements 21 of the posts 19 are also provided to separate the plates sufficiently near the middle of the wedge piece so that very little if any frictional action takes place at this point. One of the plates 14, 15, in this form of the invention forms a continuation of the free end of the member 5$^a$ and may be integral therewith. In the present form of the invention, instead of connecting the free end of the member 5$^a$ with the bracket 10$^a$ through a dash pot of the type illustrated in Fig. 2, this connection is made through a wing dash pot 22$^a$ and an arm 26$^a$, which arm is pivoted directly to the bracket 10$^a$ as at 9$^a$.

Referring more particularly to Figs. 4 and 5 it will be seen that the member 5$^a$ comprises a shallow cylinder 23$^a$ having central hub portions 30 and 31 in which the bolt 32 forming the hinge 6$^a$ is journaled. The outer end of the hub 30 is closed but the bolt 32 extends through the hub 31 which is provided with a packing ring 33 and packing 34, and is keyed to the arm 26$^a$. The outer surface 35 of the hub 31 is machined to receive the hub 36 of the relatively movable member 4 and this hub 36 is held thereon by a nut 37 and washer 38. Friction washers 39 are also arranged on both sides of the hub 36 to keep the parts tight and prevent rattling. The open end of the cylinder is closed by a disk 43 threaded into it at 44 and locked in adjusted position by a dog 45 taking in the notches 46, this disk being shown as formed integral with the hub 31. Suitably secured in the cylinder 23$^a$ by screws 40 are three abutments 41 having radial chambers 42 between each pair. The bolt 32 is provided with radial pistons 24ᵃ which are slightly smaller than the chambers 42 and are adapted to oscillate therein. The remaining space in the chambers 42 is filled with thick graphite grease or other unctuous material inserted through the opening 47 closed by the plug 48. The abutments 41 and the pistons 24ᵃ are formed with circumferential channels 49 and 50 respectively, whereby the bolt 32 may have a slight oscillatory movement relative to the cylinder 23ᵃ as it slowly displaces the thick grease through said channels. By thus providing channels in both the pistons and the abutments the single filling opening will serve for filling the entire cylinder. Shallow grooves 51 are also provided in the radial end walls of the chambers 42 through which the grease may be displaced by the piston as it approaches these end walls.

From the above it will be observed that the arm 26ᵃ has a somewhat limited movement relative to the member 5ᵃ through the wing dash pot 22ᵃ, but all sudden movements of the arm 26ᵃ imparted to it by the axle 2 to which it is pivoted through the rigid bracket 10ᵃ, are immediately conveyed to the member 5ᵃ which carries the friction plates 14 and 15. Thus the sudden vibrations of the spring hung axle are resisted by the shock absorber in the usual manner and it is only when the axle 2 alters its mean position relative to the frame 1 that the wing dash pot comes into play, and then this dash pot serves to automatically readjust the middle point of least resistance of the shock absorber to this changed mean position of the axle.

Although the automatic adjusting feature of this invention has been shown as attached to a particular form of shock absorber, it will be understood that it is not limited to applied to various other forms of shock absorbers, and it may be so combined with certain forms of shock absorbers and so altered as to assist in the work of resisting the spring action and thus become an auxiliary to the main absorber while still maintaining its function of adjustment for the main absorber.

Having thus described my invention, what I claim is,—

1. The combination with a shock absorber having a given range of action, of means for automatically varying said range relative to one of the vehicle parts.

2. The combination with a shock absorber comprising two relatively movable elements capable of a given range of operation, and means for connecting said elements to the vehicle parts, of means for automatically shifting said range relative to one of said connecting means.

3. The combination with a shock absorber having a point of least resistance which is constant relative to one of the vehicle parts, of means for automatically varying said point relative to the normal position of the other vehicle part.

4. The combination with a shock absorber having a point of least resistance, of means for automatically varying said point relative to the normal position of the vehicle parts, said means comprising a dash pot connected to the shock absorber.

5. In a shock absorber having three relatively movable parts, retarding means between two of said parts and a more sluggish retarding means between one of said two parts and the third part.

6. The combination with two spring-connected elements having a shiftable mean position, of a shock absorber between said elements, and means for automatically maintaining the point of least resistance of said shock absorber in correspondence with said mean position.

7. The combination with two spring-connected elements and a shock absorber between said elements, of a dash-pot arranged in one of the connections from said shock absorber to said elements.

8. In a motor vehicle, the combination with the frame, the axle, and the springs between the frame and axle, of a shock absorber between said frame and axle, and a dash-pot arranged in one of the connections from said shock absorber to the vehicle parts.

9. The combination with a shock absorber having a given range of action, of means for automatically varying said range relative to one of the vehicle parts comprising a dash-pot operated by the vibrations transmitted to the shock absorber.

10. A shock absorber comprising two members pivoted together, a wedge shaped piece on one of said members, spring-pressed plates on the other of said members adapted to frictionally engage said wedge piece on opposite sides, a dash-pot connected to one of said members, and means for connecting said dash-pot and the opposing member respectively to relatively movable parts of a vehicle.

11. A shock absorber comprising two members pivoted together, a wedge shaped piece on one of said members, spring-pressed plates on the other of said members adapted to frictionally engage said wedge piece on opposite sides, a cylinder rigidly connected to one of said members and arranged concentric with its pivot, an abutment therein, a wing piston having a limited oscillatory movement in said cylinder, a shaft connected to said piston, and means for connecting said shaft and the other said member respectively to different parts of a vehicle.

12. A shock absorber comprising a member formed with a cylinder having hubs, a second member journaled on one of said hubs, retarding devices between said members, a bolt journaled concentric with said cylinder, means for permitting a limited sluggish oscillatory movement between the bolt and the cylinder, and means for connecting said second member and said bolt respectively to different parts of the vehicle.

13. A shock absorber comprising a member formed with a pair of spring-pressed friction plates and a cylinder having hubs, a second member journaled on one of said hubs and having a friction arm adapted to oscillate frictionally between said plates, a bolt journaled concentric with said cylinder, means for permitting a limited sluggish oscillatory movement between the bolt and the cylinder, and means for connecting said second member and said bolt respectively to different parts of the vehicle.

14. A shock absorber comprising a member formed with a pair of spring-pressed friction plates and a cylinder having hubs, a second member journaled on one of said hubs and having a friction arm adapted to oscillate frictionally between said plates, a bolt journaled concentric with said cylinder, means for permitting a limited sluggish oscillatory movement between the bolt and the cylinder, a connecting arm attached to said bolt, and means for connecting said second member and said connecting arm respectively to different parts of the vehicle.

15. The combination in a shock absorber, of friction elements, and a dash pot comprising a cylinder, abutments in the cylinder, an oscillating piston in the cylinder having wings operating in the chambers between the abutments, packing material in the cylinder to retard the oscillations of the piston, and means to permit said packing material to be displaced by the piston as the latter nears the abutments.

16. The combination in a shock absorber, of friction elements, and a dash pot comprising a cylinder, abutments in the cylinder, an oscillating piston in the cylinder having wings operating in the chambers between the abutments, and packing material in the cylinder to retard the oscillations of the piston, said abutments having grooves in their end walls to permit said packing material to be displaced by the piston as the latter nears the abutments.

17. A shock absorber comprising a member composed of a cylinder and a pair of spring-pressed friction plates extending radially therefrom, another member journaled on the hub of said cylinder and having a friction arm adapted to slide between and frictionally engage said plates whereby relative oscillation of said members is resisted by friction, an abutment in said cylinder, a wing piston journaled to oscillate between the walls of said abutment, packing material in the cylinder to resist the oscillations of the piston, means permitting the slow passage of said packing material from one side of the piston to the other, and an arm attached to said piston for connecting it with the vehicle.

18. A shock absorber comprising friction elements, and a dash-pot connecting one of said elements with the vehicle.

19. The combination with a shock absorber having a point of least resistance, of means for automatically varying said point relative to the normal position of the vehicle parts, said variation being accomplished without lost motion at the ends of the vibratory strokes.

20. The combination with a shock absorber having a point of least resistance, and means progressively increasing the resistance from said point, of means for automatically varying said point relative to the normal position of the vehicle parts.

21. A shock absorber comprising three members pivoted together at a common point, a dash-pot between two of said members, and a frictional retarding device between another two of said members.

22. A shock absorber comprising three members pivoted together at a common point, a wing dash-pot arranged at the common point between two of said members, and a concentrically arranged frictional retarding device between another two of said members.

In testimony whereof I affix my signature in presence of two witnesses.

ALLEN LOOMIS.

Witnesses:
E. N. HEARN,
C. I. DALE.